United States Patent [19]

Lauzier et al.

[11] Patent Number: 4,705,286
[45] Date of Patent: Nov. 10, 1987

[54] BICYCLE FRAME

[75] Inventors: Rene Lauzier, Bourgoin Jallieu; Jean Rollin, Saint Etienne; Jean Choquelle, L'Horme; Gerard Dumas, St Just St Rambert; Francois Breat; Maurice Rousson, both of Saint Etienne; Paule Defour, St. Priest en Jarez, all of France

[73] Assignees: Etablissements Lauzier, Bourgoin Jallieu; Ateliers de la Rive, Saint Chamond; Bador S.A.; Angenieux-CLB S.A., both of Saint Etienne, all of France

[21] Appl. No.: 946,453

[22] Filed: Dec. 23, 1986

[30] Foreign Application Priority Data

Dec. 23, 1985 [FR] France ................................ 85 19550

[51] Int. Cl.⁴ .......................... B62K 19/22; F16B 7/02
[52] U.S. Cl. .................... 280/281 R; 403/267; 403/334
[58] Field of Search .................. 280/281 R, 279, 274; 156/294; 403/265, 267, 334

[56] References Cited

U.S. PATENT DOCUMENTS 2,267,330 12/1941 Goss ................................... 403/265
4,479,662 10/1984 Defour et al. ................... 280/281 R
4,648,616 3/1987 Diekman et al. ............... 280/281 R Primary Examiner—John A. Pekar
Attorney, Agent, or Firm—Karl F. Ross; Herbert Dubno

[57] ABSTRACT

In a bicycle frame comprising a plurality of tubes having hollow ends and a plurality of fittings having pins fitting in the hollow ends, each pin extends along an axis and has an outer surface portion of axially constant section centered on the axis and engaged in the respective tube end, an inner surface portion centered on the axis and flaring axially inward away from the inner end of the respective outer surface portion, and a shoulder surface projecting generally perpendicular from the inner end of the respective inner surface portion and facing outward. Each tube end has an end surface abutting flatly inward on the respective shoulder surface and an inner surface having an inner surface portion fitted tightly over and complementary to the inner surface portion of the respective pin and an outer surface portion radially slightly spaced from and facing the outer surface portion of the respective pin. An adhesive generally fills between the outer surface portions of each pin and the respective tube and adheres same together.

8 Claims, 14 Drawing Figures 4,705,286

BICYCLE FRAME

FIELD OF THE INVENTION

The present invention relates to a structural tube-and-fitting assembly. More particularly this invention concerns a bicycle frame.

BACKGROUND OF THE INVENTION

A tube-and-fitting assembly—such as a bicycle frame, playground equipment frame, tool stand, or the like—typically has a plurality of fittings normally cast of some rigid material and connected to the ends of the tubes. In the oldest arrangement as used particularly in a bicycle frame, the tube ends were simply brazed or welded to the fittings.

Recently, however, systems such as described in French patent documents Nos. 2,432,425 and 2,441,531 are employed where the fittings have pointed pins that are fitted into the ends of the tubes. Such an arrangement requires that a special flaring mandrel be provided to shape the tube ends complementary to the pins. In addition to ensure an accurate fit it is necessary to provide a complex jig for assembling the bicycle frame so that the various elements are put together in the right orientation.

Thus the prior system is relatively complex, necessitating careful preparation of each tube end and the use of a substantial piece of assembly equipment. As a result fabrication costs are elevated.

OBJECTS OF THE INVENTION

It is therefore an object of the present invention to provide an improved tube-and-fitting assembly.

A further object is to provide such an assembly which is usable in a bicycle frame.

Another object is the provision of such a tube-and-fitting assembly which overcomes the above-given disadvantages, that is which is simple and easy to put together.

SUMMARY OF THE INVENTION

In a bicycle frame according to the invention comprising a plurality of tubes having hollow ends and a plurality of fittings having pins fitting in the hollow ends, each pin extends along a respective axis and has an outer surface portion of axially constant section centered on the axis and engaged in the respective tube end, an inner surface portion centered on the axis and flaring axially inward away from the inner end of the respective outer surface portion, and a shoulder surface projecting generally perpendicular from the inner end of the respective inner surface portion and facing outward. Each tube end has an end surface abutting flatly inward on the respective shoulder surface and an inner surface having an inner surface portion fitted tightly over and complementary to the inner surface portion of the respective pin and an outer surface portion radially slightly spaced from and facing the outer surface portion of the respective pin. An adhesive generally fills between the outer surface portions of each pin and the respective tube and adheres same together.

Thus such an assembly can be put together by forcing each tube end and the respective pin axially together. The outer portion of the pin will ensure adequate centering, and the inner portion will plastically deform the tube end and ensure a very solid connection. The flat abutment of the tube end on the shoulder ensures an extremely accurate positioning of the two parts. All elements can be made of metal, for instance a light aluminum or magnesium alloy, and it is even conceivable to use a strong synthetic resin, for instance a glass-fiber reinforced polycarbonate, in some instances.

If the adhesive is applied to the outer end of the pin it will not make any mess at all as it will remain wholly within the joint. Any excess will be trapped inside the frame. Thus the step of cleaning up each joint after assembly is also eliminated according to this invention.

According to this invention the outer surface portions are cylindrical and the inner surface portions are frustoconical. In addition the outer surface portion of each tube is slightly larger and spaced from the outer surface portion of the respective fitting and the adhesive fills the space between the outer surface portions.

In accordance with another feature of this invention the inner surface of each flared inner surface portion is larger immediately adjacent the respective shoulder surface than the inner surface of the respective tube end at the end surface thereof prior to mounting on the respective pin.

More particularly, the bicycle frame of the invention has a top tube having front and rear ends, a down tube having upper and lower ends, a seat tube having upper and lower ends, two seat stays having upper and lower ends, two chain stays having front and rear ends, a head-tube fitting having pins fitted into the front end of the top tube and the upper end of the down tube, a front sprocket fitting having pins fitted into the lower ends of the down and seat tubes and into the front ends of the chain stays, respective rear sprocket fittings having pins fitting into the rear ends of the chain stays and into the lower ends of the seat stays, a seat fitting having a pin fitted into the rear end of the top tube and another pin, and structure connecting the other pin to the upper ends of the seat stays. Each pin and tube end is formed as described above and held together by a respective body of adhesive.

The frame also includes a back tube having an upper end engaged over the other pin of the seat fitting and a lower end and a fork having one such pin engaged upward into the lower end of the back tube and two such pins engaged downward into the upper ends of the seat stays. The seat fitting has a throughgoing hole snugly engaged around the upper end of the seat tube.

DESCRIPTION OF THE DRAWING

The above and other features and advantages will become more readily apparent from the following, reference being made to the accompanying drawing in which.

SPECIFIC DESCRIPTION

Figure 1:
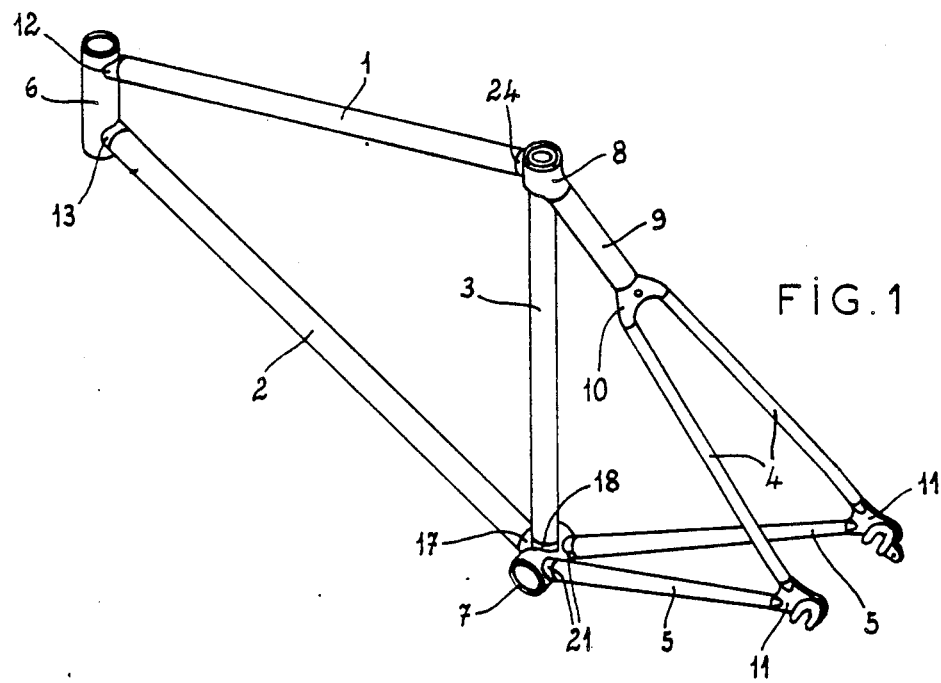
FIG. 1 is a small-scale perspective view of a bicycle frame according to this invention.
Figure 4:
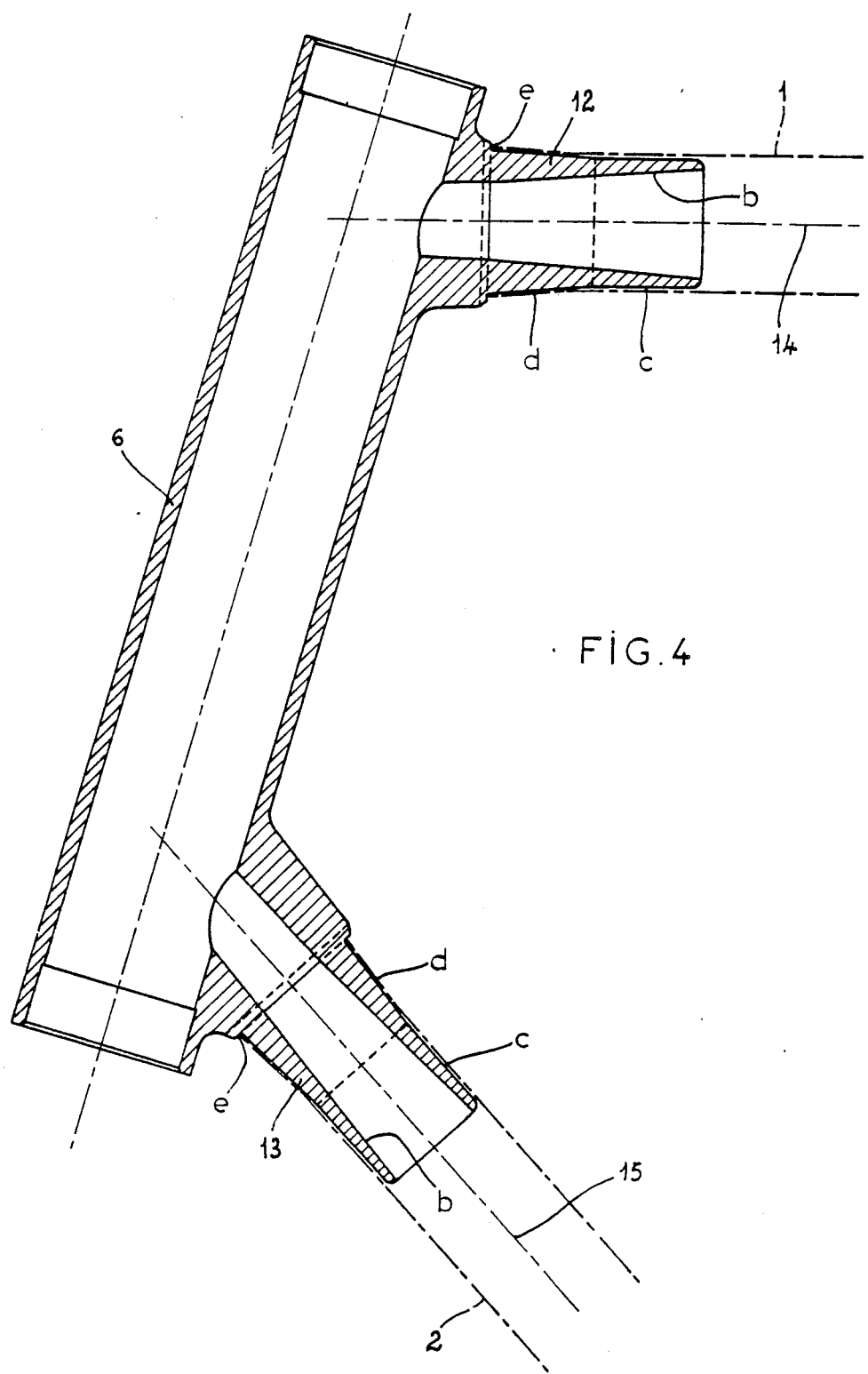
FIG. 4 is a vertical axial section through the head-tube fitting according to this invention.
Figure 5:
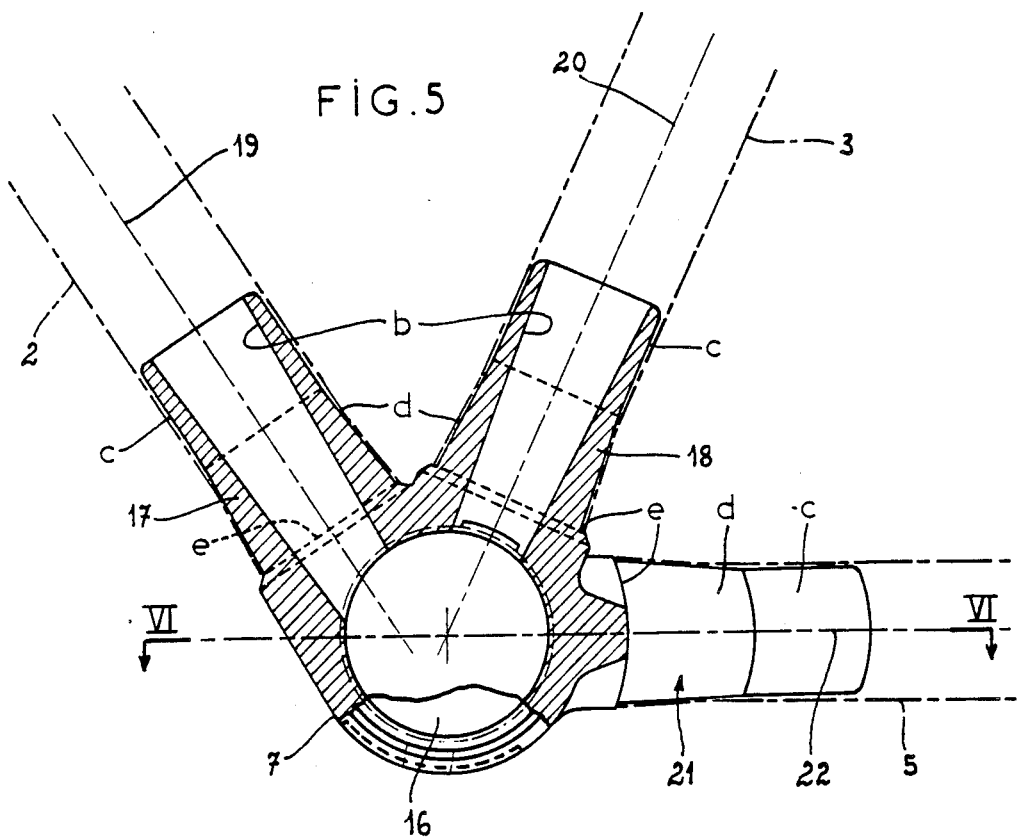
FIG. 5 is a vertical axial section through the front sprocket fitting according to this invention.
Figure 7:
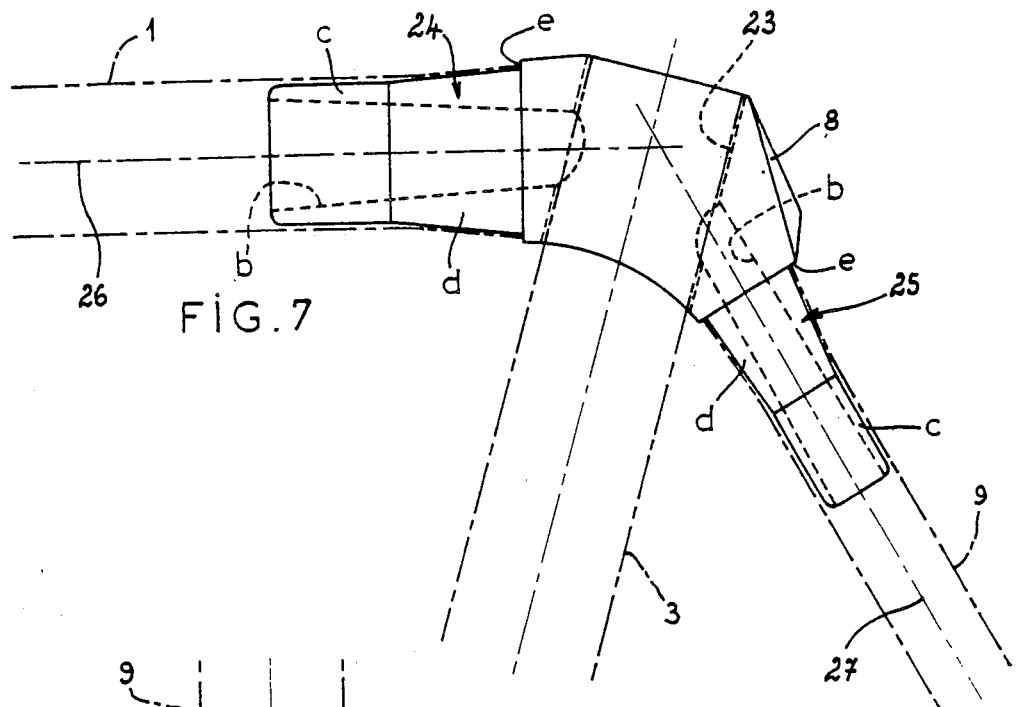
FIG. 7 is a side view of a seat fitting according to the invention.
Figure 8:
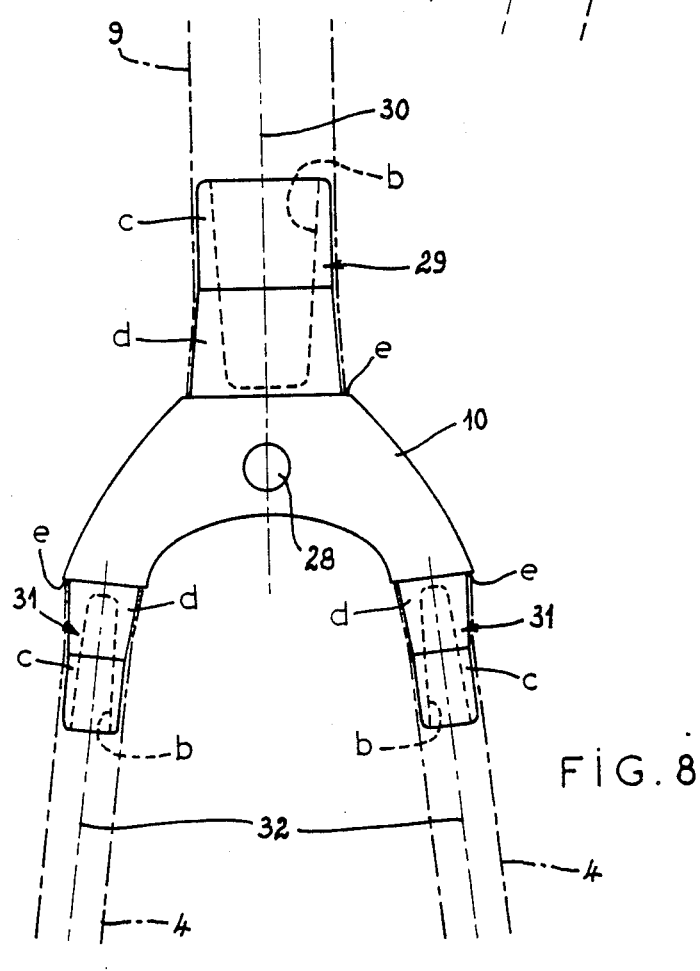
FIG. 8 is a plan view of a back stay fitting according to this invention.
Figure 14:
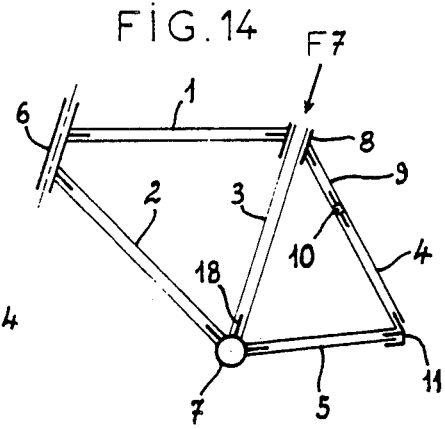

As seen in FIGS. 1 and 14 a bicycle frame basically comprises a normally horizontal top tube 1, an inclined down tube 2, and a normally upright seat tube 3 forming the sides of a triangle. As seen in FIG. 4 the top tube 1 and down tube 2 have front ends fitted over mounting pins 12 and 13 formed integrally with a head-tube fitting 6 and extending along respective axes 14 and 15 which correspond to the centers of the respective tubes 1 and 2. As seen in FIG. 5 the lower ends of the tubes 2 and 3 are respectively fitted over mounting pins 17 and 18 formed integrally with a sprocket fitting 7. The pins 17 and 18 are centered on the same axes 19 and 20 as the respective tubes 2 and 3, and the fitting 7 is formed with a transversely throughgoing bore 16 in which the sprocket shaft is eventually mounted in a bearing. As seen in FIG. 7 the seat tube 3 extends down through a complementary passage 23 in a seat fitting 8 having a front pin 24 projecting forward into the rear end of the tube 1 centered on its axis 26 and a rear pin 25 fitted into the top of a rear tube 9 projecting down and back along an axis 27.

Figure 6:
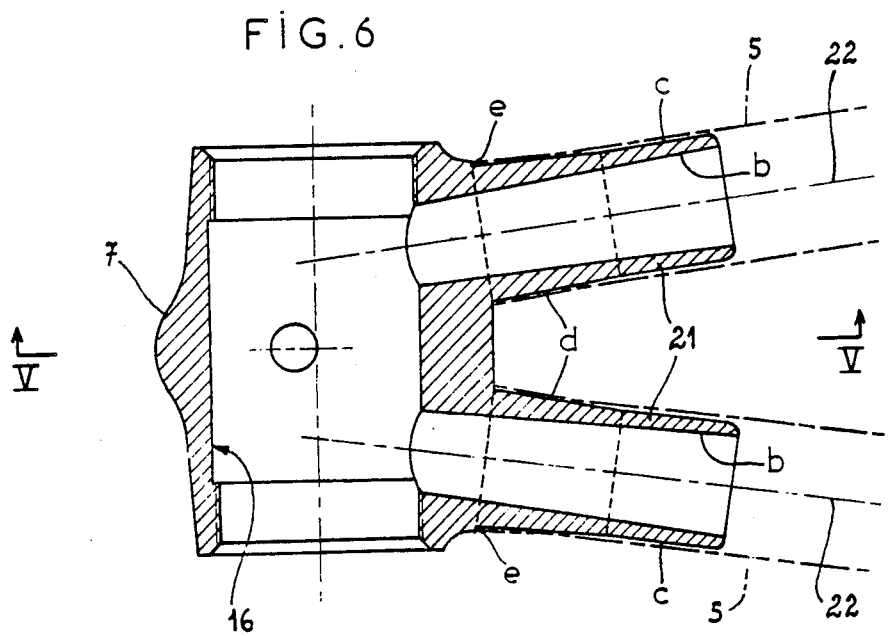
FIG. 6 is a horizontal section taken along plane VI—VI of FIG. 5, the line V—V of FIG. 6 indicating the section plane of FIG. 5.

Chain stays 5 have as shown in FIGS. 5 and 6 front ends fitting over respective pins 21 centered on the axes 22 of these tubes 5 and rear ends fitted as shown in FIG. 1 over forward lower pins of respective rear sprocket fittings 11. The lower end of the tube 9 fits over a pin 29 of a stay fork 10 having a central hole 28 for the rear brake caliper and a pair of downwardly and rearwardly projecting further smaller pins 31 for the upper ends of rear seat stays 4 whose lower rear ends are seated in upper front pins of the respective rear sprocket fittings 11. The pin 29 is centered on the respective tube axis 27 and the pins 31 on the respective stay axes 32.

Figure 2:
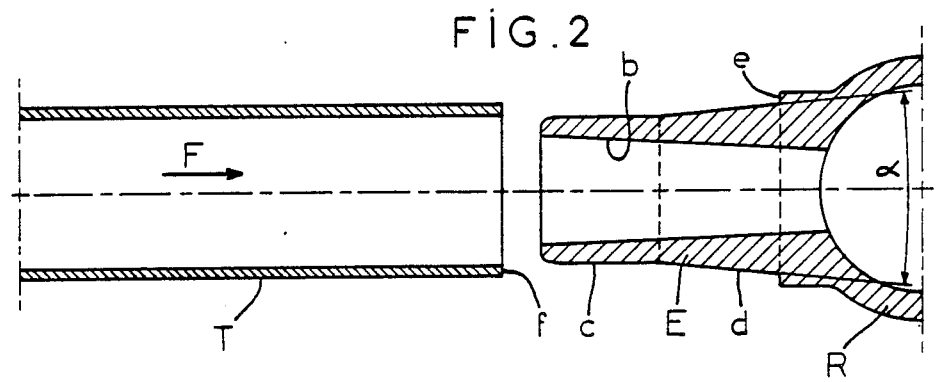
FIGS. 2 and 3 are axial sectional views showing a typical tube end before and after being fitted to a typical fitting pin.
Figure 3:
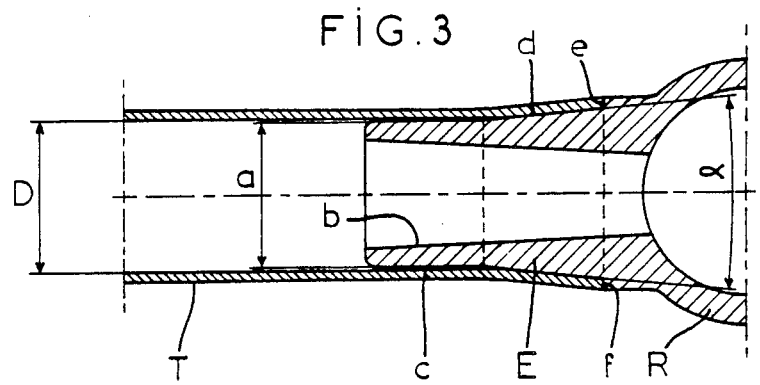

The pins 12, 13, 17, 18, 12, 24, 25, 29, and 31 are all substantially identical if differently dimensioned. Although it is common to use oval-section tubing for the stays 4 and 5, all the other tubes 1, 2, 3, and 9 are of circular section. In any case the tubes and their respective pins are of complementary section and of the same relative sizes. FIGS. 2 and 3 illustrate a fitting R which could be any of the fittings 6, 7, 8, or 10, a pin E which could be any of the pins 12, 13, 17, 18, 12, 24, 25, 29, and 31, and a tube T which could be any of the tubes 1, 2, 3, 4, 5, or 9.

The tube T is of constant and uniform section and is centered on the respective axis A. It has an inside diameter D and an annular end surface f lying in a plane perpendicular to the respective axis A. The pin E has an outer surface c that is cylindrical, centered on the axis A, and of a diameter a about 0.5 mm smaller than the diameter d. Flaring inward from the cylindrical surface c is a frustoconical surface d that has a conicity angle b (here somewhat exaggerated) but that is centered on the axis A and that is of about the same axial length as the surface c. An annular and outwardly directed shoulder e delineates the inner end of the surface d and lies in a plane perpendicular to the axis A. The surface d has a diameter where it meets the shoulder e that is somewhat greater than the diameter D. The pin E and fitting R are formed centered on the axis A with an outwardly flaring frustoconical-surface bore b that serves principally to lighten the structure.

The connection between the tube T and the fitting R is made by forcing the tube end axially inward over the pin E. First of all the outer surface c is coated with an appropriate adhesive. Then the tube end is fitted over the pin E. As the outer surface c fits into the tube end it will center in same, but then as the tube end is forced in axial direction F against the surface d it will be plastically deformed outward until the extreme tube end surface f abuts the surface e and the tube end is complementarily and tightly engaged on the surface d. The space between the surface c and the inner surface of the tube T is thus left filled with an appropriate adhesive G. The exact seating of the surfaces e and f on each other ensures a perfect relative position of the tube T and fitting R.

A bicycle frame according to the invention and as illustrated in FIG. 1 is basically assembled in three main steps.

Figure 9:
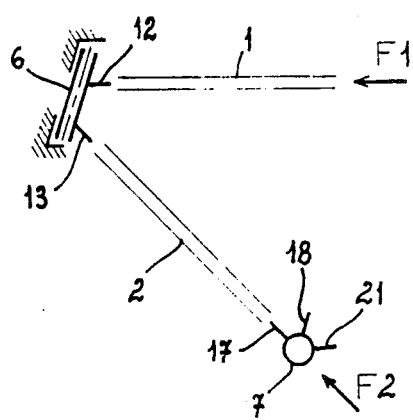
FIGS. 9 and 10 schematically illustrate the front subassembly comprising the top and down tubes, the head fitting, the front sprocket and the down tube, respectively before and after being joined together.
Figure 10:
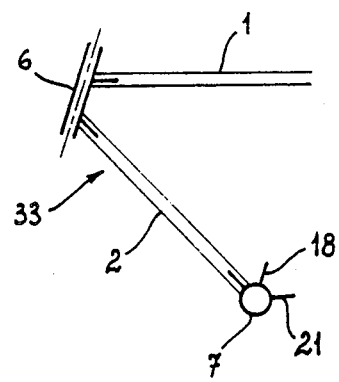

First of all as shown in FIGS. 9 and 10 a front subassembly 33 is formed by arresting the head-tube fitting 6 and then fitting the tube 1 over its pin 12 in the direction F1. The tube 2 is then fitted over the pin 13 and the pin 17 is fitted in the same direction F2 into the opposite end of this tube 2.

Figure 11:
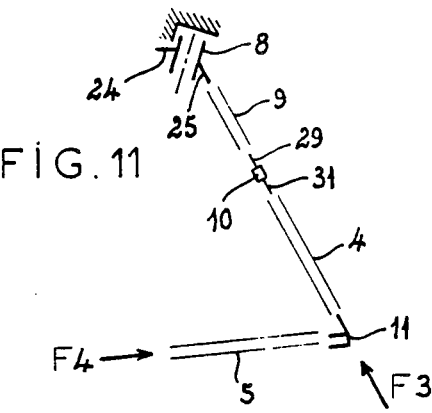
FIGS. 11 and 12 schematically illustrate the rear subassembly comprising the rear sprocket fittings, the chain and seat stays, the back fork, and rear tube, respectively before and after being joined together.
Figure 12:
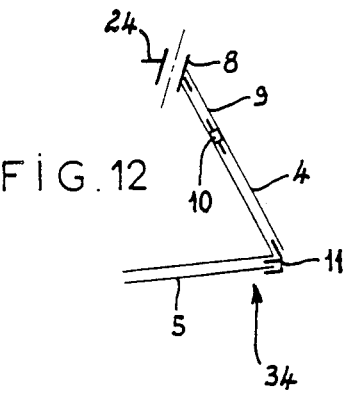

Then as seen in FIGS. 11 and 12 a rear subassembly 34 is made by arresting the seat fitting 8 and fitting the rear tube 9 over the pin 25 while fitting the pin 29 to the opposite end of the tube 9, the stays 4 to the pins 31 of the fork fitting 10, and fitting the rear sprocket fittings 11 all together and pushing on the fittings 11 in the directions F3 parallel to the axes 32. Then the chain stays 5 are fitted in directions F4 onto the fittings 11 to complete this subassembly 34.

Figure 13:
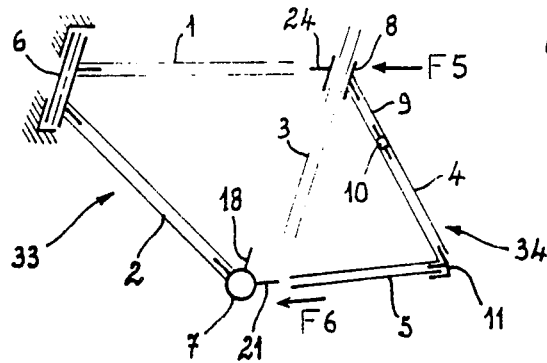
FIGS. 13 and 14 schematically illustrate the joining of the rear subassembly to the front subassembly and the installation of the seat tube, respectively before and after being joined together.

Last, as shown in FIGS. 13 and 14 the rear subassembly is pushed in generally parallel directions F5 and F6 parallel to the respective axes 14 and 22 so that the pin 24 seats in the rear end of the tube 1 and the stays 5 in the pins 21, and then the seat tube F7 is slid in direction F7 through the hole 23 of the seat fitting 8 to seat on the pin 18 of the fitting 7. The top end of the tube 3 is normally bolted or adhered in the fitting 23. Thus the bicycle frame is completed in three simple stages.

We claim:

1. In a bicycle frame comprising a plurality of tubes having hollow ends and a plurality of fittings having pins fitting in the hollow ends, the improvement wherein each pin extends along an axis and has
an outer surface portion of axially constant section centered on the axis and engaged in the respective tube end,
an inner surface portion centered on the axis and flaring axially inward away from the inner end of the respective outer surface portion, and
a shoulder surface projecting generally perpendicular from the inner end of the respective inner surface portion and facing outward;

each tube end, which prior to be fitted onto the respective pin has a constant cross section, after being fitted onto the respective pin has an end surface abutting flatly inward on the respective shoulder surface and an inner surface having an inner surface portion fitted tightly over and complementary to the inner surface portion of the respective pin and an outer surface portion radially slightly spaced from and facing the outer surface portion of the respective pin; and an adhesive generally fills between the outer surface portions of each pin and the respective tube and adheres same together.

2. The improved bicycle frame defined in claim 1 wherein the outer surface portions are cylindrical and the inner surface portions are frustoconical.

3. The improved bicycle frame defined in claim 1 wherein the cross section ot the outer surface portion of each tube is slightly larger and spaced from the cross section of the outer surface portion of the respective fitting so that a space is formed between the outer surface portions, the adhesive filling the space between the outer surface portions.

4. The improved bicycle frame defined in claim 3 wherein the outer surface portions are cylindrical and the diameter of the outer surface portion of each pin is slightly less than the diameter of the outer surface portion of the tube receiving the respective pins.

5. The improved bicycle frame defined in claim 1 wherein the inner surface of each flared inner surface portion is larger immediately adjacent the respective shoulder surface than the inner surface of the respective tube end at the end surface thereof prior to mounting on the respective pin.

6. A bicycle frame comprising:
 a top tube having front and rear ends;
 a down tube having upper and lower ends;
 a seat tube having upper and lower ends;
 two seat stays having upper and lower ends;
 two chain stays having front and rear ends;
 a head-tube fitting having pins fitted into the front end of the top tube and the upper end of the down tube;
 a front sprocket fitting having pins fitted into the lower ends of the down and seat tubes and into the front ends of the chain stays;
 respective rear sprocket fittings having pins fitting into the rear ends of the chain stays and into the lower ends of the seat stays:
 a seat fitting having a pin fitted into the rear end of the top tube and another pin;
 means connecting the other pin to the upper ends of the seat stays,
 each pin extending along a respective axis and having
 an outer surface portion of axially constant section centered on the axis and engaged in the respective tube end,
 an inner surface portion centered on the axis and flaring axially inward away from the inner end of the respective outer surface portion, and
 a shoulder surface projecting generally perpendicular from the inner end of the inner surface portion and facing outward;
 each tube end has an end surface abutting flatly on the respective shoulder surface and an inner surface having an inner surface portion fitted tightly over and complementary to the inner surface portion of the respective pin and an outer surface portion radially slightly spaced from and facing the outer surface portion of the respective pin; and
 respective bodies of adhesive generally filling between the outer surface portions of each pin and the respective tube and adhering same together.

7. The bicycle frame defined in claim 6 wherein the means includes
 a back tube having an upper end engaged over the other pin of the seat fitting and a lower end and
 a fork having one such pin engaged upward into the lower end of the back tube and two such pins engaged downward into the upper ends of the seat stays.

8. The bicycle frame defined in claim 6 wherein the seat fitting has a throughgoing hole snugly engaged around the upper end of the seat tube.

* * * * *